May 5, 1936. M. PROKUL 2,039,343
TWO-SEAL INNER TUBE
Filed Nov. 21, 1935
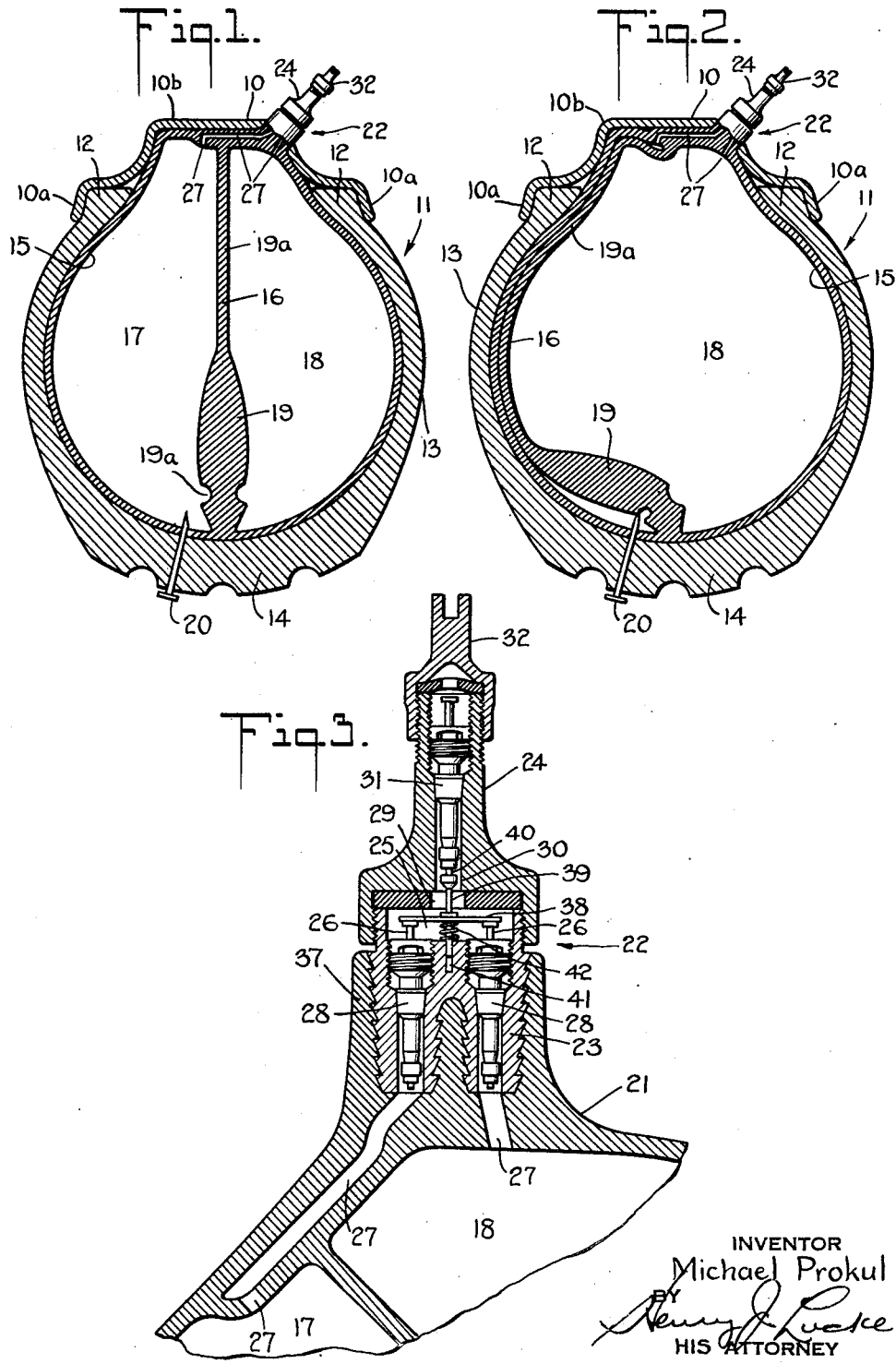
INVENTOR
Michael Prokul
BY
HIS ATTORNEY Patented May 5, 1936

2,039,343

UNITED STATES PATENT OFFICE 2,039,343

TWO-SEAL INNER TUBE

Michael Prokul, Maplewood, N. J.

Application November 21, 1935, Serial No. 50,810

2 Claims. (Cl. 152—22)

My present invention relates to air containers, and more particularly to air containers, such as inner tubes for use in tire casings for automobiles, and other like vehicles.

This application is a continuation in part of my allowed copending application Serial No. 733,265, filed June 30, 1934.

Inner tubes are generally made in form of a single annular chamber, circular in cross-section, and provided with a valve for admitting air under pressure to the interior of the tube. The tube, by and of itself, is incapable of holding the air under sufficient pressure to perform the function of a tire for a vehicle or like structure. Such tube is, therefore, enclosed in a tire casing which is sturdy and rugged enough to withstand road shocks and the requisite inflationary air pressure.

Notwithstanding the sturdy construction of the tire casing, it can be, and too often is, penetrated by objects such as nails, glass, sharp stones and the like encountered along the roadway, or elsewhere. Due to the fact that the tube, because of the air pressure, is rigidly in engagement with the inner walls of the tire casing, the penetrating object passes through the wall of the tube, thus resulting in a puncture and permitting the air under pressure within the tube to escape. Consequently the tire becomes flat. Should the puncture be relatively large, and should the vehicle on which the same is mounted be travelling at a high rate of speed, there is grave danger of injury to the occupants of such vehicle before the same can be brought to a stop. Should the puncture be relatively small, its presence may not be noticed until practically all of the air under pressure has escaped from the tube.

In either event, and under the best conditions, the inner tube will usually be destroyed, and the tire casing severely injured by being rim cut. Also, there will be the necessity of changing tires, as obviously the vehicle cannot proceed under the existing conditions. This is usually an unpleasant task, and is to be avoided where possible.

I am aware that, in the past, tubes have been designed having a plurality of separate air chambers. My present invention however, has certain features of construction which are lacking in prior structures, and which produce a practical, commercial article.

In carrying out my invention, I preferably divide the tube into two separate chambers by a diaphragm or septum lying in the central plane of the rotation of the tube when the same is located in operative position within a tire casing. Such diaphragm or septum may be called upon to move into engagement with the walls of the tubing on the failure of one of the chambers of the tube to retain the air inserted therein. That portion of the diaphragm or septum adjacent the outer diameter thereof is thickened, or reinforced, to prevent puncture of the said diaphragm or septum by the means which originally punctured the walls of the tubing, and which may possibly be retained in puncturing position by the tread or side of the tire casing. Also, such thickened or reinforced portion is provided with a reduced or weakened portion, which acts as a hinge element to more readily allow the reinforced or thickened portion to conform with the contour of the tire casing.

Each chamber of the tube is a separate and distinct chamber, and to more readily inflate and deflate the same, I have devised an improved form of multiple valve. Such valve has a single entrance provided with the usual check valve, and branching from the entrance are passages extending to the various chambers, each passage being provided with a valve. Should it be desired to deflate any or all of the various chambers, it may be done by manipulating the various valves individual to the various chambers.

As the chances of all of the various chambers being punctured at one time is extremely remote, it is obvious that my improved device will prevent those accidents due to punctures and blowouts, as above referred to, and will enable the driver of the vehicle to proceed with due safety to a place where the puncture or blowout may be repaired, or a change of tires made. Obviously, of course, in a two chamber tube, the pressure within the tire casing, after the failure of one chamber of the tube, will be but one half of that originally therein. Such a reduction of pressure, while relatively large, still permits the vehicle to proceed safely without danger to the tire casing, the tube, or the vehicle on which the same is mounted.

The principal object of my invention, therefore, is to provide an improved form of air container, such as a tire tube.

Another object of my invention is an improved multiple chamber air containing tube.

Still another object of my invention is an improved dividing diaphragm or septum for the chambers of a multi-chamber tube.

A further object of my invention is an improved flexible reinforced diaphragm or septum for the chambers of a multi-chamber tube.

Other objects and novel features of the construction and arrangement of parts comprising my device will appear as the description of the invention progresses.

In the accompanying drawing:

Fig. 1 is a cross-sectional view of a tube embodying my invention positioned within a tire casing, and with the tube inflated;

Fig. 2 is a view similar to Fig. 1, showing one of the chambers of the tube deflated and with the air within the remaining chamber expanded to fill the interior of the tire casing.

Fig. 3 is a central cross-section of a portion of a tube showing my improved valve in position therein, and with the individual valve members thereof communicating each with its individual chamber.

Referring to the drawing, 10 designates a tire rim of the drop center type on which is mounted the usual straight sided tire casing 11, comprising the side walls 13 and tread 14. The beads 12 of the tire casing 11 engage with parallelly arranged rim flanges 10a of the rim 10, which rim comprises in addition to the rim flanges a drop-center portion 10b.

Within the tire casing 11 is positioned a tube 15 embodying my present invention, such tube having the form of an annulus, substantially cylindrical in cross-section, as shown, and with a diaphragm or septum 16 extending from the inner to the outer diameter thereof, and dividing the tube 15 into a plurality of separate and distinct chambers 17 and 18 respectively.

The diaphragm or septum 16, in the preferred form of the invention, as shown in the drawing, is preferably arranged in the central plane of rotation of the tire casing 11.

That portion of the septum adjacent the outer diameter of the tube 15 is strengthened by being enlarged or reinforced, as indicated by the reference numeral 19 in Figs. 1 and 2. The point of connection of this diaphragm or septum with the inner surface of the outer diameter of the tube is sturdy and strong enough to resist being punctured by any usual puncturing means, as the nail 20 indicated in Figs. 1 and 2. Therefore the possibility of the tube being punctured in such a manner as to permit the simultaneous deflation of the chambers 17 and 18 is extremely remote.

To facilitate the bending of the diaphragm or septum 16, and particularly the thickened or reinforced portion 19 thereof, and to allow the major part of such portion to conform to the contour of one or the other of the side walls of the tube 15, as shown in Fig. 2, I have provided such thickened or reinforced portion with a weakened—or thin—area 19a. Upon the failure of one of the chambers, 17 and 18, as the chamber 18, (see Fig. 2), the consequent expansion of the air within the chamber 17 forces the diaphragm or septum 16 into engagement with the side wall of the tube 15, the weakened—or thin—area 19a acting as a hinge to permit the major part of the thickened portion 19 to bend into the position shown in such Fig. 2.

It will be noted, by reference to Fig. 2, that practically the entire thickened or reinforced portion 19 of the diaphragm or septum 16 is now located adjacent the tread 14 of the tire casing 11, so that if the agent which punctured the walls of the chamber 18, as the nail 20, still remains embedded in the tread of the tire casing the danger of such agent puncturing the walls of the chamber 17 is reduced to a minimum.

A portion of the tube 15, on the inner diameter thereof, is thickened, as indicated by the reference numeral 21 in Fig. 3, and a cylindrical boss 37 is formed integral with the tube 15 on the outside thereof. The boss 37 is in alignment with the thickened part 21, and both are perforated to receive the multiple valve embodied in my present invention.

Such valve is designated in its entirety by the numeral 22, and comprises a body 23 having its top end threaded to receive a stem 24, and its bottom end serrated to engage with the perforation in the boss 37 and thickened part 21. The valve body 23 is counterbored at 25 to house valve stem plungers 26. Branching from the lower end of the body 22 are passages 27, each communicating with a chamber 17, 18 and each housing a valve inside 28. The stem 24 screws onto the threaded upper end of the body portion 23, a perforated washer 29 being interposed between the body portion and the stem 24. The stem 24 is provided with a longitudinal passage 30 extending therethrough, and in which may be placed a valve inside 31 as shown, or this valve inside may be omitted, if desired. The outer upper end of the stem 24 is threaded to receive the usual valve cap 32.

The valve stem plungers 26 are connected together at their top ends, by a bridge piece 38, and secured to the bridge piece 38 and extending above and below the same is a stem 39. The stem 39 is in alignment with the valve stem plunger 40 of the valve inside 31 and its upper end is in engagement with such plunger 40. The lower end of the stem 39 is slidably mounted in a recess 41 in the boss 37. Between the top of the boss 37 and under face of the bridge piece 38 is a coil spring 42, which resiliently holds the valve stem plungers 26 in their uppermost position, and returns them to such position should they be displaced by the depression of the plunger 40 of the valve inside 31.

With the tube 15 equipped with a valve 22 as above described, air under pressure passing through the stem 24, flows past the valve insides 28 and into the chambers 17 and 18. Such chambers are thus simultaneously and individually supplied with air under pressure, and each chamber is separate and distinct from the other. Each acts as the complement of the other, and on the failure of one, the other acts to fill the interior of the tire casing 11 and to maintain the same in safe inflated condition until the damage to the injured chamber can be repaired or a new tube substituted therefor.

While I have shown my invention within a tire casing applied to a drop-center rim, it is within the scope of my invention to utilize the same in a tire casing mounted on a flat center or other type of rim.

Whereas I have described my invention by reference to specific forms thereof, it will be understood that many changes and modifications may be made without departing from the spirit of the invention.

I claim:—

1. In an improved multi-chamber inner tube, the combination of a tube, an annular diaphragm secured at its outer and inner peripheral edges to the outer and inner diameters of the tube and dividing said tube into a plurality of chambers, said diaphragm lying substantially in the central plane of rotation of the tube, the area of the diaphragm adjacent the outer diameter thereof being thickened, and a weakened portion in the thickened portion circumferentially arranged about the diaphragm the major part of the diaphragm hinging about the weakened portion to facilitate the conforming thereof with the wall of the tube.

2. In an improved multi-chamber inner tube, the combination of a tube, an annular diaphragm secured at its outer and inner peripheral edges to the outer and inner diameters of the tube, and dividing said tube into a plurality of chambers, said diaphragm lying substantially in the central plane of rotation of the tube, the area of the diaphragm adjacent the outer diameter thereof being thickened, and a weakened portion in the thickened portion spaced from and adjacent to the outer diameter of the diaphragm and circumferentially arranged about the diaphragm the major portion of the diaphragm hinging about the weakened portion to facilitate the conforming thereof with the wall of the tube.

MICHAEL PROKUL.